(12) United States Patent
Van Dine

(10) Patent No.: US 7,323,509 B2
(45) Date of Patent: Jan. 29, 2008

(54) FIRE-RESISTANT STRUCTURAL COMPOSITE MATERIAL

(75) Inventor: Pieter Van Dine, Mystic, CT (US)

(73) Assignee: General Dynamics Armament and Technical Products, Inc., Burlington, VT (US)

( * ) Notice: Subject to any disclaimer, the term of this patent is extended or adjusted under 35 U.S.C. 154(b) by 365 days.

(21) Appl. No.: 10/806,136

(22) Filed: Mar. 23, 2004

(65) Prior Publication Data

US 2007/0276074 A1 Nov. 29, 2007

(51) Int. Cl.
*C08K 3/10* (2006.01)
*C08K 3/40* (2006.01)

(52) U.S. Cl. .................. 524/437; 524/494; 252/601; 252/609

(58) Field of Classification Search ............. 524/437, 524/494; 252/601, 609
See application file for complete search history.

(56) References Cited

U.S. PATENT DOCUMENTS

| | | | |
|---|---|---|---|
| 4,308,197 A | 12/1981 | Byrd et al. | |
| 4,364,991 A | 12/1982 | Byrd et al. | |
| 5,058,342 A * | 10/1991 | Crompton | 52/232 |
| 5,202,189 A | 4/1993 | Shea | |
| 5,270,105 A | 12/1993 | Conroy et al. | |
| 5,298,299 A | 3/1994 | Shea | |
| 5,383,994 A | 1/1995 | Shea | |
| 5,405,661 A | 4/1995 | Kim et al. | |
| 5,586,418 A * | 12/1996 | .ANG.lander et al. | 52/450 |
| 5,736,619 A | 4/1998 | Kane et al. | |
| 5,758,694 A | 6/1998 | Friedrich et al. | |
| 5,799,705 A | 9/1998 | Friedrich et al. | |
| 6,072,252 A | 6/2000 | Van Dine et al. | |
| 6,084,008 A | 7/2000 | Liu | |
| 6,125,528 A | 10/2000 | Van Dine et al. | |
| 6,150,743 A | 11/2000 | Van Dine et al. | |
| 6,150,747 A | 11/2000 | Smith et al. | |
| 6,443,256 B1 * | 9/2002 | Baig | 181/286 |
| 2001/0018487 A1 * | 8/2001 | Itagaki et al. | 524/588 |

FOREIGN PATENT DOCUMENTS

| | | | |
|---|---|---|---|
| JP | 05162224 A | * | 6/1993 |
| JP | 10095894 A | * | 4/1998 |
| JP | 10324762 A | * | 12/1998 |
| JP | 2000351881 A | * | 12/2000 |

OTHER PUBLICATIONS

Horrocks, A.R.; Price, D. (2001). Fire Retardant Materials. (pp. 9,10,56,248). Woodhead Publishing.*
Pritchard, G. (1998). Plastics Additives—An A-Z Reference. (pp. 288-290). Springer—Verlag.*
"Specification Sheet for Nanocomposite Resin #SH12-2002-01" ; Shea Technology, Nanoreinforced Phenolic-Resorcinol Resin.
Avtec Industries, Fire Retardant Technology—product information; www.avtecindustries.com, printed Feb. 26, 2004.
"Lindride Epoxy Hardeners"; Lindau Chemicals Inc., 2003.
"Fire-Screening Results of Polymers and Composites" ; Usman Sorathia and C. Beck, Carderock Div., Naval Surface Warfare Enter, Annapolis, Maryland, internet article printed Feb. 27, 2004.
"Fire and Toxicity Test Methods and Qualification Procedure for Composite Material Systems Used in Hull, Machinery, and Structural Applications Inside Naval Submarines" ; U.S. Department of Defense, Feb. 26, 1991.
"A Fire-Resistant Epoxy" ; U.S. Dept. of Transportation, FAA; Aug. 2001 Final Report.
"Guide to Composites"; David Cripps, SP Systems, Seecom Project—Composite materials, process and applications, internet article from www.seecom.org.uk, printed Dec. 16, 2003.
"Pultrusion"; Saint-Gobain Vetrotex International, internet article from www.sgva.com, printed Dec. 4, 2003.
"Statistics in Materials Testing", 1989.
"Cone Calorimeter"; WPI Fire Protection Engineering & Center for Fire Safety Studies, internet article from www.spi.edu, printed Nov. 20, 2003.

* cited by examiner

*Primary Examiner*—Kriellion A Sanders
(74) *Attorney, Agent, or Firm*—Hunton & Williams

(57) ABSTRACT

Fire-resistant structural composites are comprised of a phenolic resin system, reinforcing fibers and alumina tri-hydrate. The composites may be formed into structural or load-bearing parts, and are particularly suited for applications requiring high strength and a high degree of fire-resistance, such as in the automotive, aircraft, or ship-building industry. Optionally, a siloxane modifier may be added to the resin system to improve the flexibility and impact resistance of the composite.

31 Claims, 3 Drawing Sheets

MIL-STD-2031 Burn-Through Fire Test Composite Sample 1407

FIRE-RESISTANT STRUCTURAL COMPOSITE MATERIAL

BACKGROUND OF THE INVENTION

1. Field of the Invention

The present invention relates to fire-resistant structural composite materials. Embodiments of the present invention pertain to formulations of commercially available components that form a composite material having superior structural, fire, smoke and toxicity characteristics. More particularly, embodiments of the present invention relate to composite formulations and structures including a phenolic-based resin system, fiber, and alumina tri-hydrate.

2. Description of Related Art

Structural composites have found use in applications where light weight, high strength and economy are important, such as, for instance, in the automotive, aircraft and ship building industry. A wide variety of structural composite materials have been developed for these applications. In some applications in which flame resistance and/or fire protection requirements are imposed, fire-resistant composites are necessary. However, fire-resistant composites are more challenging to develop and produce, especially in an economical manner, and are often unsatisfactory in structural applications when used without an underlying support structure.

The United States Department of Defense has established a test method standard and acceptance criteria for fire-resistant composite materials to be used in Naval submarines—MIL-STD-2031 (Department of Defense Test Method Standard: Fire and Toxicity Test Methods and Qualification Procedure for Composite Material Systems Used in Hull, Machinery, and Structural Applications inside Naval Submarines (26 Feb. 1991)). The standard establishes fire and toxicity test methods, requirements and the qualification procedure for composite material systems. These standards have been established to ensure that composite materials designed for such purposes are not a primary fire source, are slow to ignite and can be extinguished using normal submarine fire fighting response, and that the toxicity effects can be tolerated, particularly in the closed environment of a submarine. Engineers have found it extremely difficult to design composites that pass these standards.

One of the conventional methods of forming fire-resistant composites that meet the requirements of MIL-STD-2031 is the inclusion of fire insulation or foam, which works by providing an air space between the fire and the remaining composite structure. However, one of the disadvantages of using these composites is that the insulation or foam significantly increases the volume of the composite panel. Another conventional method of forming fire safe composites is by using metallic structures. This eliminates the need to resolve fire safety specification requirements as this is the existing accepted material, however it increases the weight and decreases corrosion-resistance properties of the composite panel.

Other methods of forming fire-resistant composites have been attempted to overcome the disadvantages of the above-mentioned methods, however these composites are unable to pass the acceptance criteria of MIL-STD-2031. One such method is coating a structural composite with a substance that imparts fire resistance. However, disadvantages to this method include additional processing steps associated with the coating process, and the break-down of the coating over time, which diminishes the fire-resistance properties of the panel. Another such method is forming the composite panel from a resin or fiber-reinforced resin. Although some resins are known for their fire-resistant properties, these resin-based composites have proven unsuitable because their exposure to heat and flames typically results in the release of by-products including chemical compounds and gases that are flammable, toxic to the environment, and pose a safety hazard if inhaled.

SUMMARY OF THE INVENTION

In view of the disadvantages of conventional fire-resistant composites, there is a need for a fire safe composite material that has superior fire, smoke and toxicity performance, in addition to being highly formable, inexpensive, low maintenance, light weight, corrosion resistant and suitable for a variety of structural applications.

In various embodiments of the present invention, a fire-resistant structural composite comprises a phenolic resin system, reinforcing fibers and alumina tri-hydrate. When the structural composite is exposed to a radiant heat source of about 100 kW/m$^2$, according to the test procedure of ASTM E-1354, the composite material has an Ignitability of greater than about 60 seconds, a 300-Second Average Heat Release of less than about 120 kW/m$^2$ and a Peak Heat Release of less than about 150 kW/m$^2$. The structural composite is suitable for forming into a structural part.

In other embodiments of the invention, a structural part is comprised of a fire-resistant structural composite comprising a phenolic resin system, reinforcing fibers and alumina tri-hydrate. When the structural composite is exposed to a radiant heat source of about 100 kW/m$^2$, according to the test procedure of ASTM E-1354, the composite material has an Ignitability of greater than about 60 seconds, a 300-Second Average Heat Release of less than about 120 kW/m$^2$ and a Peak Heat Release of less than about 150 kW/m$^2$.

In various embodiments of the invention, the phenolic resin system may be acid-catalyzed or base-catalyzed. In other embodiments, the phenolic resin system may additionally contain a siloxane modifier. The structural composite material may comprise about 17% to about 21% by weight phenolic resin based on the total weight of the composite.

In various embodiments of the present invention, the fibers may be glass fibers, or carbon fibers, or mixtures of fibers. The structural composite material may comprise about 63 to about 77% of the weight of the total composite. In various other embodiments of the present invention, the composite material comprises about 7% to about 12% by weight alumina tri-hydrate, based on the total weight of the composite material.

In various embodiments, the structural composite material may be formed by a manufacturing method, such as resin transfer molding, resin infusion, filament winding, pultrusion or vacuum assisted resin transfer molding. In some embodiments, the composite material is suitable for forming a structural part without requiring additional structural materials.

In particular embodiments, the composite material forms a structural part that is used in all or a portion of a primary load-bearing structure (such as a foundation, a frame, or a structural girder). In particular embodiments the composite material forms a structural part that is used in all or a portion of a secondary load-bearing structures (such as a deck grating, an elevator platform, a floor panel, a guide rail or a storage rail). In particular embodiments the composite material forms a structural part that is used in all or a portion of an motor component (such as a motor housing or a motor shaft). In particular embodiments the composite material forms a structural part that is used in all or a portion of a fire enclosure component. In particular embodiments, the structural parts may be used in a marine structure, or an aircraft structure, or a ground vehicle structure or a construction structure.

In various embodiments, the composite material has additional physical properties. In particular embodiments, the composite material has an ASTM E-1354 Ignitability of greater than 90 seconds, a 300-Second Average Heat Release of less than about 100 kW/m$^2$, and a Peak Heat Release of less than about 100 kW/m$^2$ when exposed to a radiant heat source of about 75 kW/m$^2$. In particular embodiments the composite material has an ASTM E-1354 Ignitability of greater than 150 seconds, a 300-Second Average Heat Release of less than about 50 kW/m$^2$, and a Peak Heat Release of less than about 65 kW/m$^2$ when exposed to a radiant heat source of about 50 kW/m$^2$. In particular embodiments, the composite material has an ISO 9705 Average Heat Release Rate of less than about 100 kW, and an ISO 9705 Smoke Production Rate of less than about 1.4 m$^2$/second.

DETAILED DESCRIPTION OF PREFERRED EMBODIMENTS

Figure 1:
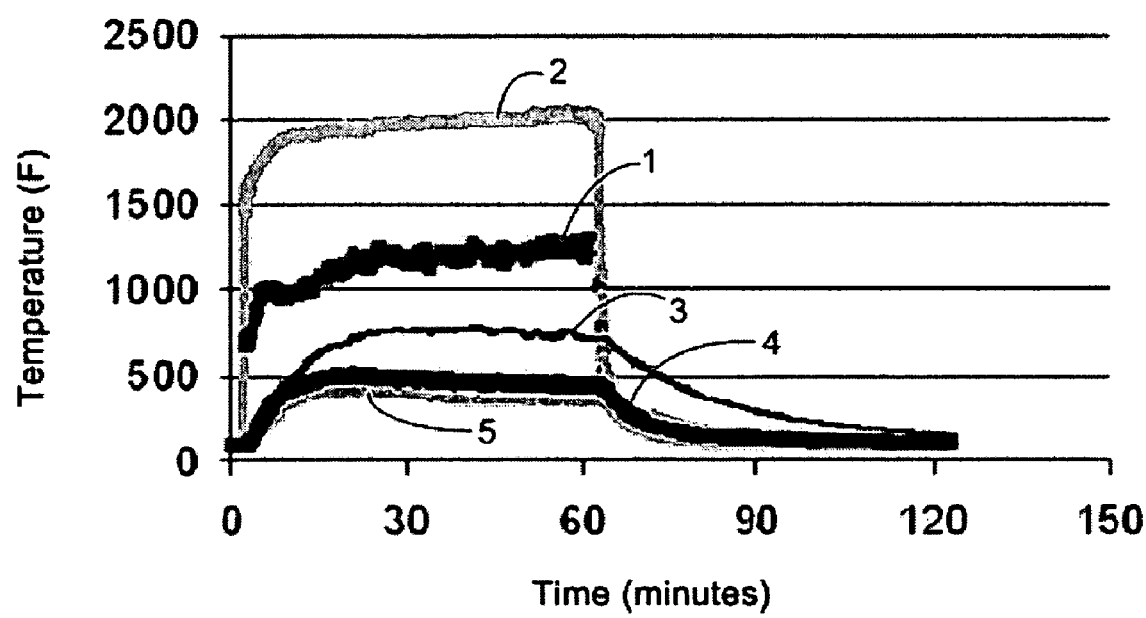
FIG. 1 is a chart showing temperature measurements of a particular embodiment during a Burn Through fire test.

The present invention is directed to a fire safe structural composite material that has superior structural, fire, smoke and toxicity performance. In particular, the structural composite material of the present invention is formed from a fiber-reinforced resin composite.

Fire-resistant composite structures of the present invention are suitable for a broad range of applications where composites are useful, and fire resistance is necessary or desirable. For instance, such fire safe composite structures are particularly suited for marine structures (both internal and external structures), aircraft structures (including engine applications, ground vehicle systems, and construction applications (e.g., composite cladding of structural girders). In these applications, fiber-reinforced resin composites have several advantages over other fire-resistant composite structures. For example, they weigh less and have superior corrosion resistance as compared to metallic composite structures. In addition, fire-resistant fiber-reinforced composite structures have improved structural fire performance compared to metallic composite structures. For instance, the Modulus of Elasticity of structural steel decreases by 60% at 1200° F. In comparison, the fire safe formulation's modulus is not affected by temperatures of up to 450° F. Fire-resistant fiber-reinforced composites of the present invention also require less maintenance, and therefore have a reduced total installed cost, than fire-resistant composites that include insulating foam. In addition, the fire-resistant composite structures of the present invention occupy less space than fire insulation composites, resulting in an increased economy of space in the structural applications.

MIL-STD-2031 (Department of Defense Test Method Standard: Fire and Toxicity Test Methods and Qualification Procedure for Composite Material Systems Used in Hull, Machinery, and Structural Applications inside Naval Submarines (26 Feb. 1991)) includes a number of tests which characterize a composite material's fire resistance performance. For each test included in MIL-STD-2031, the Department of Defense has specified minimum or maximum requirements that must be satisfied in order for the composite material to be qualified as suitable for use. One of the most stringent tests in MIL-STD-2031 is the "Cone Calorimeter Test" (ASTM E-1354, entitled: "Standard Test Method for Heat and Visible Smoke Release Rates for Materials and Products Using an Oxygen Consumption Calorimeter"). In this test, a 100 mm×100 mm composite sample is exposed to radiant heat at a preset heat flux (25, 50, 75 and 100 kW/m$^2$) for a minimum of 300 seconds. Properties evaluated are Ignitability and Heat Release. Ignitability is the average time (in seconds) when the sample ignites. The heat released from each sample (in kW/m$^2$) is recorded during the exposure time—both the average and peak heat release (for 300 seconds) are measured and recorded for each sample.

It has been found that commonly-used fiber-reinforced structural composites do not have good fire-resistance characteristics, as evidenced by their inability to pass the fire-resistance requirements MIL-STD-2031. As shown in Table 1 below, conventional fiber-reinforced resin structural composites made from phenolic and epoxy resins do not pass the ignitability, or the heat release test requirements of MIL-STD-2031.

The composites shown in Table 1 are examples of commercially-available resins. The composites are all glass-reinforced resins made using a resin-infused composite formation process (except for sample 1344 which was made using a resin transfer molding process). The samples shown here represent a variety of starting resins and curing agents. The phenolic resin composites include three different variations of phenolics: sample number 1355 is an acid-catalyzed phenolic resin; sample number 1356 is a base-catalyzed phenolic resin, and sample number 1357 is an acid-catalyzed phenolic resin with a siloxane modifier. The epoxy resin composites include commercially available products from Resolution Performance Products (formerly Shell) and one epoxy system (sample number 1344) that is available from Dow Chemical Company.

Note that Table 1 and each of the tables presented below include a row that shows the corresponding test requirements of MIL-STD-2031, and a column indicating whether the particular test sample passes or fails the MIL-STD-2031 requirements for the Cone Calorimeter test. For example, the MIL-STD-2031 requirement for the Ignitability test at 50 kW/m$^2$ heat flux is a minimum of 150 seconds; for the Peak Heat Release test at 50 kW/m$^2$ heat flux, the requirement is a maximum of 65 kW/m2.

Measured against the MIL-STD-2031 standard, none of the commercially-available epoxy resin composites or the phenolic resin composites that were tested pass all of the MIL-STD-2031 fire-resistance requirements. In fact, most of the epoxy resins fail all of the requirements for ignitability and heat release—only one sample (sample 1344) passes one of the requirements because it its Average Heat Release at 100 kW/m$^2$ heat flux is 109 kW/m$^2$ (below the acceptable limit of 120 kW/m$^2$). In comparison, the phenolic resin composites exhibit better average heat release, peak heat release and ignitability results, but they do not consistently meet the requirements of MIL-STD-2031. For example, sample 1355 exhibits the best overall fire-resistance of the phenolic-based composites, and it meets the MIL-STD-2031 criteria for peak and average heat release, but it exceeds the ignitability limits at heat fluxes of 75 and 100 kW/m², and therefore fails to satisfy the overall fire-resistance requirements of MIL-STD-2031. These results demonstrate the shortcomings of conventional epoxy and phenolic resin based composites for fire-resistant applications.

ite (sample 1323) passes all criteria except for the Ignitability at 100 kW/m², but the results are right at the upper limit. The phenolic/polyester blends tested (samples 1311 and 1328) show improved fire-resistance over the phenolic

TABLE 1

Cone Calorimeter Test: Structural Composites Made of Conventional Fiber-Reinforced Resins

| Sample # | Resin[1] | Cure Agent[2] | Additive[3] | Mfg. Method | Ignitability (seconds) Heat Flux | | | Peak Heat Release (kW/m²) Heat Flux | | | Avg Heat Release-300 s (kW/m²) Heat Flux | | | P/F MIL-STD-2031 |
|---|---|---|---|---|---|---|---|---|---|---|---|---|---|---|
| | | | | | 50 | 75 | 100 | 50 | 75 | 100 | 50 | 75 | 100 | |
| Phenolic Resins: | | | | | | | | | | | | | | |
| 1355 | GP 849D98 | GP 4824HB | — | Resin Infusion | 333 | 79 | 41 | 46 | 76 | 87 | 31 | 46 | 50 | F |
| 1356 | GP 652D79 | GP 012G23 | — | Resin Infusion | 192 | 96 | 50 | 81 | 110 | 130 | 53 | 81 | 65 | F |
| 1357 | GP 652D79 | GP 790D62 | — | Resin Infusion | 197 | 80 | | 83 | 112 | | 53 | 83 | | F |
| Epoxy Resins: | | | | | | | | | | | | | | |
| 1321 | Shell 861 | Lindride 6K | — | Resin Infusion | 93 | 35 | 18 | 211 | 221 | 243 | 132 | 211 | 156 | F |
| 1336 | Shell 861 | Lindride 6K | — | Resin Infusion | 76 | 39 | | 195 | 227 | | 126 | 195 | | F |
| 1337 | Shell 861 | Lindride 6K | — | Resin Infusion | 50 | 22 | | 236 | 290 | | 116 | 236 | | F |
| 1339 | Shell 1050 | Lindride 6K | — | Resin Infusion | 55 | 26 | | 178 | 210 | | 91 | 178 | | F |
| 1341 | Shell 861 | Phen-Nov | EMI-24 | Resin Infusion | 122 | 47 | | 238 | 290 | | 139 | 238 | | F |
| 1344 | Tactix 123 | H41 | | Resin Transfer Molding | 54 | 19 | 10 | 556 | 761 | 988 | 329 | 556 | 109 | F |
| MIL-STD-2031 Requirements: | | | | | >150 | >90 | >60 | <65 | <100 | <150 | <50 | <100 | <120 | |

[1]Resin Systems:
GP 849D98 and GP 652D79 are commercially available phenolic resin systems, available from Georgia Pacific Corp., Atlanta, GA
Shell 861 and Shell 1050 are commercially available epoxy resin systems, available Resolution Performance Products LLC, Houston, TX (formerly Shell Chemicals).
Tactix 123 is a commercially available epoxy resin system, available from Dow Chemical Co., Midland, MI.
[2]Cure Agents/Catalysts:
GP 4824HB is a commercially available acid-type curing agent, available from Georgia Pacific Corp., Atlanta, GA.
GP 012G23 is a commercially available base-type curing agent, available from Georgia Pacific Corp., Atlanta, GA.
GP 790D62 is a commercially available acid-type curing agent with a siloxane modifier, available from Georgia Pacific Corp., Atlanta, GA.
Lindride 6K is a commercially available epoxy-resin curing agent, available from the Lindau Chemical Company, Columbia, SC.
Phen-Nov is phenolic novolac resin which is cured with the epoxy resin.
H41 is a commercially available epoxy-resin curing agent, available from Dow Chemical Co., Midland, MI.
[3]Additives:
EMI-24 is 2-ethyl-4-methylimidazole, which is a commercially curing or hardening additive, such as the one marketed as Imicure 24 available from Air Products and Chemicals, Allentown, PA.

There are some commercially available specialty chemicals that have good fire-resistance characteristics. For example cyanate ester, phenolic/polyester blend, silicone and phthalonitrile are specialty chemicals that typically have good thermal stability, low flammability, low smoke generation and high glass transition temperatures. Composites made with some of these commercially-available specialty chemicals are capable of passing one or more of the MIL-STD-2031 requirements for the Cone Calorimeter Test, as shown in Table 2 below. For instance, the results demonstrate that the cyanate ester composite (sample 1310) exhibits the best overall fire resistance of the specialty chemicals tested, and passed all of the criteria for MIL-STD-2031. In addition, the phthalonitrile composite (sample OP1) passes all of the MIL-STD-2031 criteria; and the silicone composand epoxy composites, such as those in Table 1, but do not pass the MIL-STD-2031 ignitability criteria, particularly at 100 kW/m².

Although some of these specialty chemicals have acceptable fire resistance properties, they are undesirable for use in structural composites because they are difficult to obtain and they are expensive. All of these materials cost between $100 and $1000/pound, which is prohibitively expensive for most applications. In addition, they are difficult to obtain and difficult to process because they require, for example, high heat and special tooling. Furthermore, the silicone glass-reinforced composite has poor mechanical performance, making it unsuitable for most structural applications.

TABLE 2

Cone Calorimeter Test: Composites Made From Specialty Chemicals

| Sample # | Base Material[1] | Forming Method | Fiber | Ignitability (seconds) Heat Flux | | | Peak Heat Release (kW/m²) Heat Flux | | | Avg Heat Release - 300 s (kW/m²) Heat Flux | | | P/F MIL-STD-2031 |
|---|---|---|---|---|---|---|---|---|---|---|---|---|---|
| | | | | 50 | 75 | 100 | 50 | 75 | 100 | 50 | 75 | 100 | |
| 1310 | CE-CIBA | Resin Infusion | Glass | NI | 330 | 139 | | 15 | 37 | | 4 | 7 | P |
| 1311 | P/P-MKVII | Resin Infusion | Glass | 349 | 97 | 21 | 36 | 64 | 79 | 30 | 48 | 53 | F |
| 1323 | SI-CF | Resin Infusion | Glass | 415 | 113 | 60 | 10 | 51 | 62 | 5 | 36 | 41 | F |
| 1328 | P/P-MKIX | Resin Infusion | Glass | 368 | 32 | 21 | 54 | 76 | 81 | 41 | 56 | 59 | F |
| OP1 | PN Glass | Resin Infusion | Glass | 530 | 142 | 71 | 34 | 95 | 127 | 26 | 53 | 61 | P |
| MIL-STD-2031 Requirements: | | | | >150 | >90 | >60 | <65 | <100 | <150 | <50 | <100 | <120 | |

[1]Base Specialty Chemicals:
CE-CIBA: Cyanate ester, product # RD98-228 manufactured by Ciba Specialty Chemicals, Tarrytown, NY.
P/P MKVII: Phenolic/polyester, product Mark VII, available from Shea Technology.
SI-CF: Silicone, product Cytec Fiberite MXB S826A, available from Cytec Engineered Materials, Tempe, AZ.
P/P MKIX: Phenolic/polyester, product Mark IX, available from Shea Technology.
PN Glass: Phthalonitrile, available from the Naval Research Laboratory.

Fibers are commonly used in structural composites to reinforce the resin, providing additional strength to the resultant structural composite. The mechanical properties of the structural composite are determined, in large part, by the mechanical properties of the fibers, the amount of fibers in the composite, and the interaction/adhesion between the fibers and the resin. Different types of fibers may produce different fire-resistant characteristics in the composite. For instance, a comparison of composites containing glass fibers and carbon fibers in Table 3 below shows that carbon fiber composites exhibit better (higher) time to ignition and lower peak heat release, as compared to glass fiber composites; and glass fiber composites exhibit better (lower) average heat release than the carbon fiber composites. However, the fiber-type has only a limited impact on the overall fire resistance of the composites, as exhibited by the results in Table 3, in which neither glass nor carbon fibers improve the fire resistance of the epoxy resin to a point where it can pass all of the MIL-STD-2031 criteria.

There are several commercially available composite manufacturing techniques, each of which involves a unique way of combining the fibers and the resins of the composite. The manufacturing method can affect the mechanical characteristics of the composite, as well as the fire resistance characteristics. For instance, Table 4 below shows a comparison of fire-resistance test results of composites made by four different manufacturing methods: resin infusion, pultrusion, filament winding and resin transfer molding. Table 4 shows that resin infusion (RI) composites are superior to pultrusion (PUL) composites, because composites formed by resin infusion have lower average and peak heat release, and higher times to ignition. In this test, the pultruded composite samples had a resin-rich layer on the surface of the panel. Without intending to be bound by theory, it is believed that this resin-rich layer acts as a fuel, igniting when exposed to heat. It is further believed that pultruded composites with a fiber-rich layer on the surface exhibit improved fire-resistance performance, more similar to the resin-infused composites. The results in Table 4 also show that composites produced by filament winding (FW) are superior to resin transfer molding (RTM) composites because the filament-wound composites have lower average and peak heat release, and higher times to ignition. Indirectly, the table also shows that filament winding (FW)

TABLE 3

Cone Calorimeter Test: Fiber Type Comparison

| Sample # | Resin[1] | Cure Agent[2] | Forming Method | Fiber[1] | Ignitability (seconds) Heat Flux | | | Peak Heat Release (kW/m²) Heat Flux | | | Avg Heat Release - 300 s (kW/m²) Heat Flux | | | P/F MIL-STD-2031 |
|---|---|---|---|---|---|---|---|---|---|---|---|---|---|---|
| | | | | | 50 | 75 | 100 | 50 | 75 | 100 | 50 | 75 | 100 | |
| 1343 | Tactix 123 | H41 | Resin Transfer Molding | Carbon | 65 | 26 | 16 | 502 | 610 | 709 | 285 | 303 | 289 | F |
| 1344 | Tactix 123 | H41 | Resin Transfer Molding | Glass | 54 | 19 | 10 | 556 | 761 | 988 | 329 | 115 | 109 | F |
| MIL-STD-2031 Requirements: | | | | | >150 | >90 | >60 | <65 | <100 | <150 | <50 | <100 | <120 | |

[1]Resin System:
Tactix 123 is a commercially available epoxy resin system, available from Dow Chemical Co., Midland, MI.
[2]Cure Agent:
H41 is a commercially available epoxy-resin curing agent, available from Dow Chemical Co., Midland, MI.

produces similar results as resin infusion (RI). (As mentioned above, carbon fiber composites have slightly lower average and peak heat release than glass fibers, which must be accounted for in this comparison.) It has been observed that the resin transfer molding (RTM) process typically leaves a resin-rich layer on the surface of the composite, which ignites when exposed to heat. For this reason, the resin transfer molding process is inferior to the other processes evaluated. In general, the preferable methods of fire-resistant and composite production are filament winding, resin infusion and pultrusion (where a fiber-rich surface is produced).

Release in the Cone Calorimeter test, when compared to an epoxy-resin composite without a coating (sample 1375). However, in general, the coatings do not improve the ignition time of the base composite material. Without wishing to be bound by theory, it is believed that this effect is due in part to the coating's insulating properties, which causes

TABLE 4

Cone Calorimeter Test: Manufacturing Methods Comparison

| Sample # | Resin[1] | Cure Agent[2] | Manufacture Method | Fiber | Ignitability (seconds) Heat Flux | | | Peak Heat Release (kW/m$^2$) Heat Flux | | | Avg Heat Release - 300 s (kW/m$^2$) Heat Flux | | | P/F MIL-STD-2031 |
|---|---|---|---|---|---|---|---|---|---|---|---|---|---|---|
| | | | | | 50 | 75 | 100 | 50 | 75 | 100 | 50 | 75 | 100 | |
| 1321 | Shell 862 | Lindride 6K | Resin Infusion | Glass | 93 | 35 | 18 | 211 | 221 | 243 | 132 | 144 | 156 | F |
| 1375 | Shell 862 | Lindride 6K | Pultrusion | Glass | 69 | 28 | 16 | 268 | 328 | 390 | 169 | 204 | 231 | F |
| 1342 | Shell 862 | Lindride 6K | Filament Winding | Carbon | 70 | 32 | 19 | 142 | 169 | 236 | 87 | 114 | NA | F |
| 1345 | Shell 862 | Lindride 6K | Resin Transfer Molding | Carbon | 43 | 19 | 13 | 567 | 738 | 833 | 327 | 177 | 154 | F |
| MIL-STD-2031 Requirements: | | | | | >150 | >90 | >60 | <65 | <100 | <150 | <50 | <100 | <120 | |

[1]Resin System:
Shell 862 is a commercially available epoxy resin system, available from Resolution Performance Products LLC, Houston, TX (formerly Shell Chemicals).
[2]Cure Agent:
Lindride 6K is a commercially available epoxy-resin curing agent, available from the Lindau Chemical Co., Columbia, SC.

To improve the fire resistance of traditional composites, there are a variety of commercially-available coatings that may be applied to the surface of a composite, for use in fire-resistant applications. For example, intumescent-based coatings expand when subjected to heat, thereby insulating the substrate to which they are applied. Table 5 shows the result of coating an epoxy-resin composite with several commercially-available fire-resistant coatings. The results demonstrate that the composites containing the fire-resistant coatings tend to have improved (lower) Average Heat heat build-up on the surface of the coating and results in premature ignition. An exception to this is the Pyroflex coating manufactured by Fire & Materials (sample 1394). This coated composite has both a higher time to ignition and lower heat release when compared to the base composite material. However, it is clear from the results that these commercially-available fire-resistant coatings are not independently capable of improving the fire-resistance of a traditional composite so that it can satisfy the requirements of MIL-STD-2031.

TABLE 5

Cone Calorimeter Test: Coatings Comparison

| Sample # | Resin[1] | Cure Agent[2] | Coating[3] | Mfr Method | Fiber | Ignitability (seconds) Heat Flux | | | Peak Heat Release (kW/m$^2$) Heat Flux | | | Avg Heat Release - 300 s (kW/m$^2$) Heat Flux | | | P/F MIL-STD-2031 |
|---|---|---|---|---|---|---|---|---|---|---|---|---|---|---|---|
| | | | | | | 50 | 75 | 100 | 50 | 75 | 100 | 50 | 75 | 100 | |
| 1375 | Shell 862 | Lind 6K | None | Pul-trusion | Glass | 69 | 28 | 16 | 268 | 328 | 390 | 169 | 204 | 231 | F |
| 1373 | Shell 862 | Lind 6K | Therma-shield | Pul-trusion | Glass | 79 | 32 | 12 | 262 | 298 | 343 | 65 | 92 | 122 | F |
| 1382 | Shell 862 | Lind 6K | Therma-flex | Pul-trusion | Glass | 38 | 20 | | 117 | 252 | | 62 | 102 | | F |
| 1393 | Shell 862 | Lind 6K | Pyro-flex | Pul-trusion | Glass | 22 | 11 | | 50 | 287 | | 7 | 42 | | F |
| 1394 | Shell 862 | Lind 6K | Pyro-plus | Pul-trusion | Glass | 352 | 63 | | 222 | 267 | | 143 | 68 | | F |
| MIL-STD-2031 Requirements: | | | | | | >150 | >90 | >60 | <65 | <100 | <150 | <50 | <100 | <120 | |

[1]Resin System:
Shell 862 is a commercially available epoxy resin system, available from Resolution Performance Products LLC, Houston, TX (formerly Shell Chemicals).
[2]Cure Agent:
Lindride 6K is a commercially available epoxy-resin curing agent, available from the Lindau Chemical Co., Columbia, SC.
[3]Coatings:
Thermashield ™ and Thermaflex are commercially available fire-resistant coatings, available from AVTEC Industries, Hudson, MA.
Pyroplus and Pyroflex are commercially available fire-resistant coatings, available from Fire & Materials.

Like coatings, there are also a number of commercially-available additives that may be used to improve the fire-resistance of materials. Examples of commercially-available additives include alumina tri-hydrate ("ATH") and TSWB™ (a commercially-available fire retardant product made by AVTEC Industries). It has been found that the inclusion of ATH in the composite formulation improves the fire-resistant characteristics of the structural composite. It has been suggested that the hydrated alumina gives off water when heated, which extends the time to ignition and lowers the peak and average heat release rates of the composite.

Table 6 shows the effect of the addition of ATH or TSWB™ on the fire-resistance of a structural composite. The results show that composites including the ATH (samples 1379, 1396 and 1395) exhibit improved ignitability and 100 kW/m² peak heat release as compared to composites containing no additive (sample 1356). The ATH composites also exhibit better fire resistance properties than a TSWB™-containing composite (sample 1380), particularly in relation to average and peak heat release. These results also show that an increase in the amount ATH results in an improvement in the fire resistance of a composite. Composites containing ATH at 20%-30% by volume of resin do not pass the MIL-STD-2031 requirements for ignitability at 100 kW/m² heat flux, but when the ATH is increased to 50% by volume of the resin (as in sample 1395), the resultant composite is capable of passing MIL-STD-2031. Unfortunately at this relatively high level of ATH, the mechanical strength of the composite is diminished so that it is no longer suitable for structural applications. Thus, the results demonstrate that the mere addition of a commercially-available fire-resistant additive to a traditional composite is inadequate to provide a composite that has fire-resistance properties to satisfy MIL-STD-2031, and mechanical properties suitable for applications such as in the automotive, aircraft and ship-building industry.

is economical and practical to use. In specific, the structural composites of the present invention have superior fire, smoke and toxicity performance capable of satisfying the stringent MIL-STD-2031 requirements. The composites of the present invention are also highly formable, inexpensive, low maintenance, light weight, corrosion resistant and are suitable for a variety of structural applications including, for instance, automotive, aircraft and boat panels.

In a preferred embodiment of the invention, the fire-resistant structural composite includes: a phenolic based resin system, reinforcing fibers, and alumina tri-hydrate. Phenolic-based resins are chosen for this application because they are characterized by excellent heat, flame and chemical resistance. In addition, phenolic-based resins have good electrical insulation properties, good resistance to moisture and oxygen, excellent adhesion to a wide variety of substrates, and low cost of production. The phenolic based resin system of the present invention includes a resin and a curing agent (or catalyst). The curing agent may be either an acid type or a base- (or alkali-) type curing agent or catalyst. Examples of suitable resin systems include, for example, CELLOBOND® J2027L resin with CELLOBOND® Phencat 382 acid-type catalyst (both commercially available from Borden Chemical Inc. of Columbus, Ohio); and GP 652D80 resin, with GP 012G24 base-type curing agent, commercially available from Georgia Pacific Corp. of Atlanta, Ga. In a preferred embodiment of the present invention, the fire-resistant composite of the present invention contains between about 17 and 21% of the resin by weight of the total composite.

In one feature of an embodiment of the invention, the phenolic based resin system includes a siloxane modifier. Phenolic resins prepared by using a sufficient amount of silicone intermediate to form phenolic siloxane compositions have enhanced flexibility and impact resistance properties when compared to non-siloxane containing phenolic

TABLE 6

Cone Calorimeter Test: Additives Comparison

| Sample # | Resin[1] | Cure Agent[2] | Additive[3] | Mfr Method | Fiber | Ignitability (seconds) Heat Flux | | | Peak Heat Release (kW/m²) Heat Flux | | | Avg Heat Release - 300 s (kW/m²) Heat Flux | | | P/F MIL-STD-2031 |
|---|---|---|---|---|---|---|---|---|---|---|---|---|---|---|---|
| | | | | | | 50 | 75 | 100 | 50 | 75 | 100 | 50 | 75 | 100 | |
| 1356 | GP 652D79 | GP 012G23 | None | Resin Infusion | Glass | 192 | 96 | 50 | 81 | 110 | 130 | 53 | 61 | 65 | F |
| 1380 | GP 652D79 | GP 012G23 | TSWB | Resin Infusion | Glass | 206 | 57 | | 91 | 112 | | 69 | 74 | | F |
| 1379 | GP 652D79 | GP 012G23 | 20% ATH | Resin Infusion | Glass | 279 | 114 | 44 | 83 | 106 | 98 | 57 | 70 | 66 | F |
| 1396 | GP 652D79 | GP 012G23 | 30% ATH | Resin Infusion | Glass | 354 | 116 | 44 | 50 | 88 | 120 | 33 | 52 | 69 | F |
| 1395 | GP 652D79 | GP 012G23 | 50% ATH | Resin Infusion | Glass | 595 | 256 | 79 | 23 | 48 | 81 | 17 | 21 | 33 | P |
| MIL-STD-2031 Requirements: | | | | | | >150 | >90 | >60 | <65 | <100 | <150 | <50 | <100 | <120 | |

[1]Resin System:
GP 652D79 is a commercially available phenolic resin system, available from Georgia Pacific Corp., Atlanta, GA
[2]Cure Agent/Catalysts:
GP 012G23 is a commercially available base-type curing agent, available from Georgia Pacific Corp., Atlanta, GA.
[3]Additives:
ATH: Alumina tri-hydrate, % shown is by volume of the resin
TSWB ™ is a commercially-available fire retardant product made by AVTEC Industries, Hudson, MA.

In contrast to the materials and composites presented above, the present invention provides a fire-resistant structural composite that has a combination of superior fire-resistant properties and excellent mechanical properties, and compositions. The siloxane may be incorporated as part of the commercially-available resin system, such as, for example, the GP 790D62 resin, which is commercially available from Goergia-Pacific Corp., Atlanta, Ga. Alternatively, the siloxane modifier may be an additive separately added to the resin mixture, such as, for example, Dow DC-3074, commercially available from Dow Chemical Co., Midland, Mich. In a preferred embodiment of the invention, the siloxane modifier is included in the resin in approximately a 2% concentration by weight, based on the total resin weight.

In a preferred embodiment, the fire-resistant structural composite also comprises alumina tri-hydrate. ATH is present in the structural composite to improve the peak heat release of the composite. In a preferred embodiment, the fire-resistant structural composite formulation contains about 7-12% ATH by weight, based on the weight of the resin. In another preferred embodiment of the invention, in which an acid-catalyzed phenolic based resin is used, the fire-resistant structural composite contains approximately 7% ATH by weight of the total composite. In yet another preferred embodiment of the invention, in which a base-catalyzed phenolic based resin is used, the fire-resistant structural composite contains approximately 12% ATH by weight of the total composite.

In a preferred embodiment, the fire-resistant structural composite also comprises reinforcing fibers. Fibers are used in the composite formulation to structurally reinforce the resin, providing additional strength to the resultant structural composite. The mechanical properties of the structural composite are determined, in large part, by the mechanical properties of the fibers, the amount of fibers in the composite, and the interaction/adhesion between the fibers and the resin. The fibers generally only have a slight impact on the fire performance of the composite. Suitable fibers preferably do not melt when exposed to fire, and may be selected from conventional filament materials, including glass or carbon fibers. In some applications, it may be desirable to use a blend of two or more types of fibers to obtain the benefits of each, for instance, by using both glass and carbon fibers a composite would benefit from the strength of the carbon fibers, and reduced cost of the glass fibers. In one embodiment of the invention the composite contains carbon fibers, which results in a lower peak heat release and longer time to ignition. Preferably, the composite formulation of the present invention contains between 63% and 77% fiber by weight of the composite. The fibers may be oriented primarily on one direction, or may be multi-directional. The fibers may be continuous filaments, or they may have discrete lengths. The fibers may be introduced as filaments, or as a web of filaments, such as a woven or nonwoven textile.

In forming the composite of the present invention, the resin system and the alumina tri-hydrate are mixed and then used to wet the fibers. The resin-fiber mixture subsequently cures to form the resultant composite structure. The resin and the fibers may be combined using any conventional or later-developed composite manufacturing techniques. Such methods include, for instance, pultrusion, resin infusion, filament winding, resin transfer molding, vacuum assisted resin transfer molding, etc.

EXAMPLES

Embodiments of the Present Invention

In accordance with particular embodiments of the present invention, several test samples were prepared and tested to characterize the fire-resistant structural composites of the present invention. All samples were prepared using a resin infusion manufacturing process, and all samples include a phenolic-based resin, glass fibers, and an ATH additive. The test samples were manufactured as panels that were 24 inches×24 inches×¼ inch thick, with no visible voids, no signs of resin starvation, and a void content of less than 1%. Table 7 below shows the formulations of several embodiments of the present invention for which test samples were prepared and tested.

TABLE 7

Formulations of Fire-Resistant Structural Composites

| | Resin[1] | | Curing Agent[3] | | First Additive[4] | | Second Additive[4] | | Fiber | |
|---|---|---|---|---|---|---|---|---|---|---|
| Sample # | Name | $\%^2$ ±10% | Name | $\%^2$ ±1% | Name | −2% +8% | Name | $\%^2$ ±0.5% | Type | $\%^2$ ±10% |
| 1395 | GP 652D79 | 17 | GP 012G23 | 1 | ATH | 12 | (none) | 0 | Glass | 70 |
| 1397 | Borden J2027L | 19 | Phencat 382 | 2 | ATH | 7 | Dow DC-3074 | 2 | Glass | 70 |
| 1399 | Borden J2027L | 19 | Phencat 382 | 2 | ATH | 7 | Dow DC-3074 | 2 | Glass | 70 |

TABLE 7-continued

Formulations of Fire-Resistant Structural Composites

| | Resin[1] | | Curing Agent[3] | | First Additive[4] | | | Second Additive[4] | | Fiber | |
|---|---|---|---|---|---|---|---|---|---|---|---|
| Sample # | Name | %[2] ±10% | Name | %[2] ±1% | Name | %[2] −2% +8% | | Name | %[2] ±0.5% | Type | %[2] ±10% |
| 1400 | Borden J2027L | 21 | Phencat 382 | 2 | ATH | 7 | | (none) | 0 | Glass | 70 |
| 1407 | Borden J2027L | 21 | Phencat 382 | 2 | ATH | 7 | | (none) | 0 | Glass | 70 |
| A | GP 849D98 | 21 | GP 4824HB | 2 | ATH | 7 | | (none) | 0 | Glass | 70 |
| B | GP 652D79 | 20 | GP 790D62 | 1 | ATH | 9 | | (none) | 0 | Glass | 70 |
| C | GP 5022 | 20 | GP 4824HB | 1.5 | ATH | 7 | | Dow DC-3074 | 1.5 | Glass | 70 |

[1]Resin Systems:
GP 652D79 is a commercially available phenolic resin system, available from Georgia Pacific Corp., Atlanta, GA
Borden J2027L (Cellobond ® J2027L) is a commercially available phenolic resin system, available from Borden Chemical Inc., Columbus, OH.
GP 849D98 is a commercially available phenolic resin system, available from Georgia Pacific Co, Atlanta, GA.
GP 5022 is a commercially available phenolic resin system, available from Georgia Pacific Co, Atlanta, GA.
[2]All %'s are by weight of the structural composite
[3]Cure Agents/Catalysts:
GP 012G23 is a commercially available base-type curing agent, available from Georgia Pacific Corp., Atlanta, GA.
Phencat 382 (Celloband ® Phencat 382) is a commercially available acid-catalyst, available from Borden Chemical, Inc., Columbus, OH.
GP 4824HB is a commercially available acid-type curing agent, available from Georgia Pacific Corp., Atlanta, GA.
GP 790D62 is a commercially available acid-type curing agent with a siloxane modifier, available from Georgia Pacific, Atlanta, GA.
[4]Additives:
ATH: Alumina tri-hydrate is a commercially available fire-resistant additive
Dow DC-3074 is a commercially available siloxane modifier additive that is available from Dow Chemical Co., Midland, MI.

Sample 1395 is an example of a base-cured phenolic-based resin composite, with 12% ATH (by weight of the total composite). Samples 1397, 1399 and C are examples of acid-cured phenolic-siloxane-based resin composites, with 7% ATH (by weight of the total composite). Samples 1400, 1407 and A are examples of acid-cured phenolic-based resin composites, with 7% ATH (by weight of the total composite). Sample B is an example of an acid-cured phenolic-siloxane-based resin composite with 9% ATH (by weight of the total composite).

Test samples made in accordance with each of these embodiments were subjected to the Cone Calorimeter test, the results of which are shown in Table 8 below. These results confirm that all of the examples prepared in accordance with embodiments of the present invention satisfy the fire-performance requirements of MIL-STD-2031.

TABLE 8

Cone Calorimeter Test of Fire-Resistant Structural Composites

| | | | | | | Ignitability (seconds) Heat Flux | | | Peak Heat Release (kW/m$^2$) Heat Flux | | | Avg Heat Release - 300 s (kW/m$^2$) Heat Flux | | | |
|---|---|---|---|---|---|---|---|---|---|---|---|---|---|---|---|
| Sample # | Resin[1] | Cure Agent[2] | Additive[3] | Mfr Method | Fiber | 50 | 75 | 100 | 50 | 75 | 100 | 50 | 75 | 100 | P/F MIL-STD-2031 |
| 1395 | GP 652D79 | GP 012G23 | ATH | Resin Infusion | Glass | 595 | 256 | 79 | 23 | 48 | 81 | 17 | 21 | 33 | P |
| 1397 | Borden J2027L | Phencat 382 | ATH + Siloxane | Resin Infusion | Glass | 505 | 132 | 70 | 25 | 99 | 113 | 20 | 61 | 66 | P |
| 1399 | Borden J2027L | Phencat 382 | ATH + Siloxane | Resin Infusion | Glass | 355 | 156 | 66 | 57 | 65 | 80 | 37 | 41 | 47 | P |

TABLE 8-continued

Cone Calorimeter Test of Fire-Resistant Structural Composites

| Sample # | Resin[1] | Cure Agent[2] | Additive[3] | Mfr Method | Fiber | Ignitability (seconds) Heat Flux | | | Peak Heat Release (kW/m$^2$) Heat Flux | | | Avg Heat Release - 300 s (kW/m$^2$) Heat Flux | | | P/F MIL-STD-2031 |
|---|---|---|---|---|---|---|---|---|---|---|---|---|---|---|---|
| | | | | | | 50 | 75 | 100 | 50 | 75 | 100 | 50 | 75 | 100 | |
| 1400 | Borden J2027L | Phencat 382 | ATH | Resin Infusion | Glass | 377 | 236 | 66 | 33 | 34 | 54 | 23 | 25 | 31 | P |
| 1407 | Borden J2027L | Phencat 382 | ATH | Resin Infusion | Glass | 340 | 163 | 62 | 47 | 72 | 82 | 35 | 49 | 56 | P |
| MIL-STD-2031 Requirements: | | | | | | >150 | >90 | >60 | <65 | <100 | <150 | <50 | <100 | <120 | |

[1]Resin System:
GP 652D79 is a commercially available phenolic resin system, available from Georgia Pacific Corp., Atlanta, GA. Borden J2027L (Cellobond ® J2027L) is a commercially available phenolic resin system, available from Borden Chemical Inc., Columbus, OH.
[2]Cure Agent/Catalysts:
GP 012G23 is a commercially available base-type curing agent, available from Georgia Pacific Corp., Atlanta, GA. Phencat 382 (Cellobond ® Phencat 382) is a commercially available acid-catalyst, available from Borden Chemical, Inc., Columbus, OH.
[3]Additives:
ATH: Alumina tri-hydrate
Siloxane: Dow DC-3074, a commercially available siloxane modifier, available from Dow Chemical Co., Midland, MI.

In addition to the results shown above, the Cone Calorimeter test also produces conditions to measure smoke obscuration and toxicity of the test samples. Additional properties that are measured in this evaluation are the Specific Extinction Area (SEA), which is a measure of the visible smoke produced by the exposure of the composite to heat; the average Heat of Combustion (HOC), and the production rate of carbon monoxide and carbon dioxide. The MIL-STD-2031 has pass/fail requirements for these properties at 25 kW/m$^2$, at other test conditions, it is generally preferable to minimize the results. Table 9 shows the results for the test samples exposed to a 50 kW/m$^2$ heat source, and Table 10 shows the results of sample number 1407, when exposed to 25, 50, 75 and 100 kW/m$^2$ heat source.

TABLE 10

Cone Calorimeter Test of Fire-Resistant Structural Composite at Various Heat Fluxes

| Sample # | Heat Flux of Test (kW/m$^2$) | Average Specific Extinction Area (m$^2$/kg) | Average Heat of Combustion (KJ/kg) | Average CO Conc. (kg/kg) | Average CO$_2$ Conc. (kg/kg) |
|---|---|---|---|---|---|
| 1407 | 25 | 182 | 1.79 | 0.1467 | 0.20 |
| 1407 | 50 | 110 | 11.61 | 0.171 | 0.81 |
| 1407 | 75 | 180 | 12.71 | 0.070 | 1.00 |
| 1407 | 100 | 216 | 13.89 | 0.033 | 1.12 |

TABLE 9

Cone Calorimeter Test of Fire-Resistant Structural Composites at 50 kW/m$^2$ Heat Flux

| Sample # | Resin[1] | Cure Agent[2] | Additive[3] | Mfr Method | Fiber | Average Specific Extinction Area (m$^2$/kg) | Average Heat of Combustion (KJ/kg) | Average CO Conc. (kg/kg) | Average CO$_2$ Conc. (kg/kg) |
|---|---|---|---|---|---|---|---|---|---|
| 1395 | GP 652D79 | GP 012G23 | ATH | Resin Infusion | Glass | N/A | 6.08 | 0.1334 | 0.42 |
| 1397 | Borden J2027L | Phencat 382 | ATH + Siloxane | Resin Infusion | Glass | N/A | 8.57 | 0.1274 | 0.41 |
| 1399 | Borden J2027L | Phencat 382 | ATH + Siloxane | Resin Infusion | Glass | 203 | 10.85 | 0.0101 | 0.9 |
| 1400 | Borden J2027L | Phencat 382 | ATH | Resin Infusion | Glass | 1.6 | 8.39 | 0.2153 | 0.41 |
| 1407 | Borden J2027L | Phencat 382 | ATH | Resin Infusion | Glass | 110 | 11.61 | 0.171 | 0.81 |

[1]Resin Systems:
GP 652D79 is a commercially available phenolic resin system, available from Georgia Pacific Corp., Atlanta, GA. Borden J2027L (Cellobond ® J2027L) is a commercially available phenolic resin system, available from Borden Chemical Inc., Columbus, OH.
[2]Cure Agents/Catalysts:
GP 012G23 is a commercially available base-type curing agent, available from Georgia Pacific Corp., Atlanta, GA. Phencat 382 (Celloband ® Phencat 382) is a commercially available acid-catalyst, available from Borden Chemical, Inc., Columbus, OH.
[3]Additives:
ATH: Alumina tri-hydrate
Siloxane: Dow DC-3074, a commercially available siloxane modifier, available from Dow Chemical Co., Midland, MI.

As discussed previously, the Cone Calorimeter test is the most stringent of the tests included in MIL-STD-2031. For this reason, it is useful as a screening test for MIL-STD-2031. However there are a number of other test requirements that a composite must satisfy in order to be fully qualified as suitable for Naval applications. The other tests specified by MIL-STD-2031 include the Burn-through test (specified by MIL-STD-2031, Appendix B), Smoke Obscuration test (specified by ASTM E-662), Quarter-scale fire test (specified by MIL-STD-2031, Appendix C) and the Large scale Open Environment test (specified by MIL-STD-2031, Appendix D). The embodiments of the present invention are capable of satisfying all of these requirements of the MIL-STD-2031, as demonstrated by the results below.

Because many of these tests are costly, two representative samples were selected to complete the remaining fire-resistance and toxicity tests under MIL-STD-2031: (1) sample 1407, which is an example of a glass-reinforced acid-cured phenolic-based resin composite, with 7% ATH; and (2) sample 1399, which is an example of a glass-reinforced acid-cured phenolic-siloxane-based resin composite, with 7% ATH. The results for these samples in the other MIL-STD-2031 tests are shown below in Table 11, as well as the MIL-STD-2031 criteria, for comparison. Both samples 1407 and 1399 satisfied the given criteria. Based on the success of these two samples in the tests, and the representative nature of these samples, it is believed all embodiments of the invention satisfy all criteria for MIL-STD-2031, as well.

TABLE 11

MIL-STD-2031 Tests: Fire-Resistant Structural Composites

| Fire Test/ Characteristic | Test Method | MIL-STD-2031 Requirements | Sample 1407 | Sample 1399 |
|---|---|---|---|---|
| Smoke Obscuration | ASTM E-662 | | | |
| Density, during 300 seconds Dmax occurrence | | <100 | 1 | 6 |
| non-flaming | | <200 sec | 2 | 20 |
| flaming | | <200 sec | 3 | 46 |
| Combustion gas generation, at 25 kW/m² irradiance | ASTM E-1354 | | | |
| CO | | <200 ppm | <200 | 50 |
| $CO_2$ | | <4% vol | 0.5 | none detected |
| HCl | | <100 ppm | Trace | none detected |
| HCN | | <30 ppm | None detected | 1 ppm |
| Burn-through fire test | MIL-STD-2031 Appx. B | No burn-through in 30 min. | Pass[1] | n/a[1] |
| Large Scale Open Environment/Quarter Scale Fire Test Pass/Fail (MIL-STD-2031) | MIL-STD-2031 Appx. C/D | Pass | Pass[2] Pass | n/a[2] |

[1]The Burn-through test results are presented in detail below, and in FIG. 1. Because this test is very expensive to conduct, only one sample (sample 1407) was tested, but success is predicted for all embodiments.
[2]Large Scale Open Environment and Quarter Scale Fire Tests were satisfied by performance of ISO 9705 - Room corner test, shown below in Table 11. Because this test is very expensive to conduct, only one sample (sample 1407) was tested, but success is predicted for all embodiments.

The Smoke Obscuration test (ASTM E-662) shown in Table 11 involves a measurement of smoke density, and the time of the highest density during a 300 second test in both flaming and non flaming conditions. The Combustion gas generation test (ASTM E-1354) is a measurement of the concentration of combustion gases produced while a sample is exposed to a 25 kW/m² heat source. The gases of interest for MIL-STD-2031 are carbon monoxide (CO), carbon dioxide($CO_2$), hydrogen chloride (HCl) and hydrogen cyanide (HCN). Both samples 1399 and 1407 satisfied the MIL-STD-2031 criteria for these tests.

The Burn-through test (MIL-STD-2031, Appendix B) measures the fire tolerance and fire resistance of a composite substrate. In this test, a specimen is placed in front of a 500,000 BTU/hour propane fire. Temperatures of 2000° F. are produced at the specimen surface (via direct flame, and hydrocarbon pool fire). The unexposed side of the substrate is monitored for fire resistance, and the time to burn through the materials is measured. The requirement of MIL-STD-2031 is that there is no burn-through during 30 minutes of exposure. Because of the expense of this test, only sample 1407 (an acid-cured phenolic-based resin composite, with 7% ATH) was subjected to the Burn-through test. The results in Table 1 and FIG. 1 show that sample 1407 exceeded the MIL-STD-2031 criteria, sustaining flame exposure for 60 minutes without burn-through.

FIG. 1 shows temperature measurements over time as the sample is exposed to the flame. On the flame-exposed side of the sample, temperature measurements were taken at the burner (line 1), and on the surface of the composite sample (line 2). On the non-flame side of the sample, temperature measurements were taken on the surface of the composite (line 4) at four sensors (measured at the top, bottom, middle, and bottom right of the sample), of the air on the non-flame side of the test sample (line 5) and on the test frame (line 3). As shown in FIG. 1, after 60 minutes of flame exposure, the fire side of the composite sample (shown by line 2) reached a temperature of 2000° F., while the non-fire side of the composite (shown by line 4) only reached temperatures slightly above 500° F., resisting burn through. Based on the success of this sample in the Burn-though test, it is anticipated that the other embodiments are also capable of passing the Burn-through test.

Another requirement of the MIL-STD-2031 is the Large scale open environment test and the Quarter-scale fire test. Both of these criteria may be satisfied by the ISO 9705 test, called the Room Corner Fire Test, which evaluates composite materials for potential for flame spread within a compartment, from ignition to flashover. In this test, the sample panels covered the walls and ceiling of a compartment, and a propane gas burner was placed in the corner, emitting 100 kW for 10 minutes, and 300 kW for 10 minutes. The heat release and smoke production rates of the sample panel was measured and recorded. Because this test is costly to perform, only sample 1407 (an acid-cured phenolic-based resin composite, with 7% ATH) was tested. Table 12 below shows the heat release and smoke production results of the sample 1407 in the ISO 9705 Room Corner Fire Test, along with the ISO 9705 test standard that is necessary to pass MIL-STD-2031 criteria. The results show that test sample 1407 satisfied the heat release and the smoke production criteria for ISO 9705. Based on the success of this sample in the Room Corner Fire test, it is anticipated that all embodiments are capable of passing this test.

TABLE 12

Room Corner Fire Test: Fire-Resistant Structural Composites

| | ISO 9705 Standard | Test Results Sample # 1407 |
|---|---|---|
| Heat Release (kW) | | |
| Test Average | <100 | 59 |
| Max 30 sec average | <500 | 123 |
| Smoke Production Rate (m²/s) | | |
| Test Average | <1.4 | 0.39 |
| Max 60 sec average | <8.3 | 0.61 |
| Pass/Fail (ISO 9705 Std) | | Pass |

In addition to the MIL-STD-2031 test results shown above, samples 1399 and 1407 were subjected to a Limiting Oxygen Index test (specified in ASTM D-2863). This test measures the minimum concentration of oxygen that will support combustion at three different temperatures. At 25° C., the test criteria is less than 35% oxygen, at 75° C., the requirement is greater than 30% oxygen, and at 300° C., the requirement is more than 21% oxygen. Test samples 1399 and 1407 both passed this criteria, far exceeding the specified limits, as shown in Table 13 below. Based on the success of these samples, it is anticipated that all embodiments are capable of passing this test.

Test samples 1399 and 1407 were also subjected to a Surface flammability test (specified in ASTM E-162), the results of which are in Table 13. In this test a sample measuring 6 inches×18 inches×1 inch thick is fixed at an angle to a radiant heat source. Ignition is forced at the upper edge of the sample, and as the flame spread progresses downward it is measured. Samples 1399 and 1407 passed the test criteria, both having a flame spread index well below 20 (see Table 13 below). Based on the success of these samples, it is anticipated that all embodiments are capable of passing this test.

TABLE 13

Other Fire-Resistance Properties of the Fire-Resistant Structural Composites

| Fire Test/ Characteristic | Test Method | Requirements | Sample 1407 | Sample 1399 |
|---|---|---|---|---|
| Limiting Oxygen Index | ASTM D-2863 (Modified) | | | |
| 25° C. | | >35 | >100 | >100 |
| 75° C. | | >30 | >100 | >100 |
| 300° C. | | >21 | 82.5-84.4 | 50-53.9 |
| Flame Spread Index | ASTM E-162 | <20 | 3.02 | 2.55 |
| Pass/Fail (MIL-STD-2031) | | | Pass | |

Another important characteristic of the fire-resistant structural composite is its mechanical strength. It is essential that the fire-resistant composite has suitable strength to provide structural integrity to a load-bearing part without the necessity for additional structural components. It is also important for the fire-resistant composite to maintain its strength at high temperatures. Test sample 1407 was subjected to mechanical testing to characterize its suitability for structural applications. Table 14 below shows some of the mechanical properties of the embodiment of test sample 1407 at both room temperature and at 405° F. These results demonstrate that all of the composites of the present invention have sufficient mechanical strength to be suitable for structural applications, such as in automotive, aircraft and ship building parts. In addition, the results show that the mechanical strength of the composite is not affected by temperatures up to 450° F. These design values are used with traditional closed form and finite element methods to design structures.

TABLE 14

Mechanical Data for Fire-Resistant Structural Composite

| | Test Results Sample 1407 | |
|---|---|---|
| Characteristic | Room Temp. | 450° F. |
| B Basis Tensile Strength | 39.5 ksi | 32.5 ksi |
| Tensile Modulus | 2.77 msi | 2.74 msi |
| B Basis Compressive Strength | 26.8 ksi[1] | 19.7 ksi[1] |
| Mean Flexural Strength | 31.7 ksi[1] | 20.7 ksi[1] |
| Interlaminar Shear | 4.2 ksi[1] | 3.14 ksi[1] |

[1]Mean Value, sample size did not support B Basis

Because the fire-resistant structural composite exhibits good mechanical strength, it is capable of being formed into and used as a structural or load-bearing part. A benefit of the structural composite of the present invention is that it may be used in a load-bearing part without the need for additional structural components to support a load. When used in this manner, the part formed entirely of the structural composite material may be capable of forming the entire load-bearing path through the structural part. In other applications, the load-bearing part formed from the structural composite may also include one or more additional structural components to supplement the strength of the part and provide additional support for the overall load-bearing structure. In this configuration, the additional structural parts form all or a part of the load bearing path through the structural part.

A structural part formed of the fire-resistant structural composite of the present invention is useful in a variety of structural elements. For instance, the structural part may be used in all or a portion of a primary load-bearing structure. Primary load-bearing structures are typically capable of heavy loading, and are essential to the integrity of the overall structure. Examples of primary load-bearing structures include, for example, foundations, frames, and a structural girders. A structural part of the present invention may also be useful as a secondary load-bearing structure. Secondary load-bearing structures only carry occasional loads, and are typically used for access or to hang items in or on a primary structure. Examples of secondary load-bearing structures include, for example, a deck grating, an elevator platform, a floor panel, a guide rail, a storage rail, a floor support or a hanging support.

Figure 2:
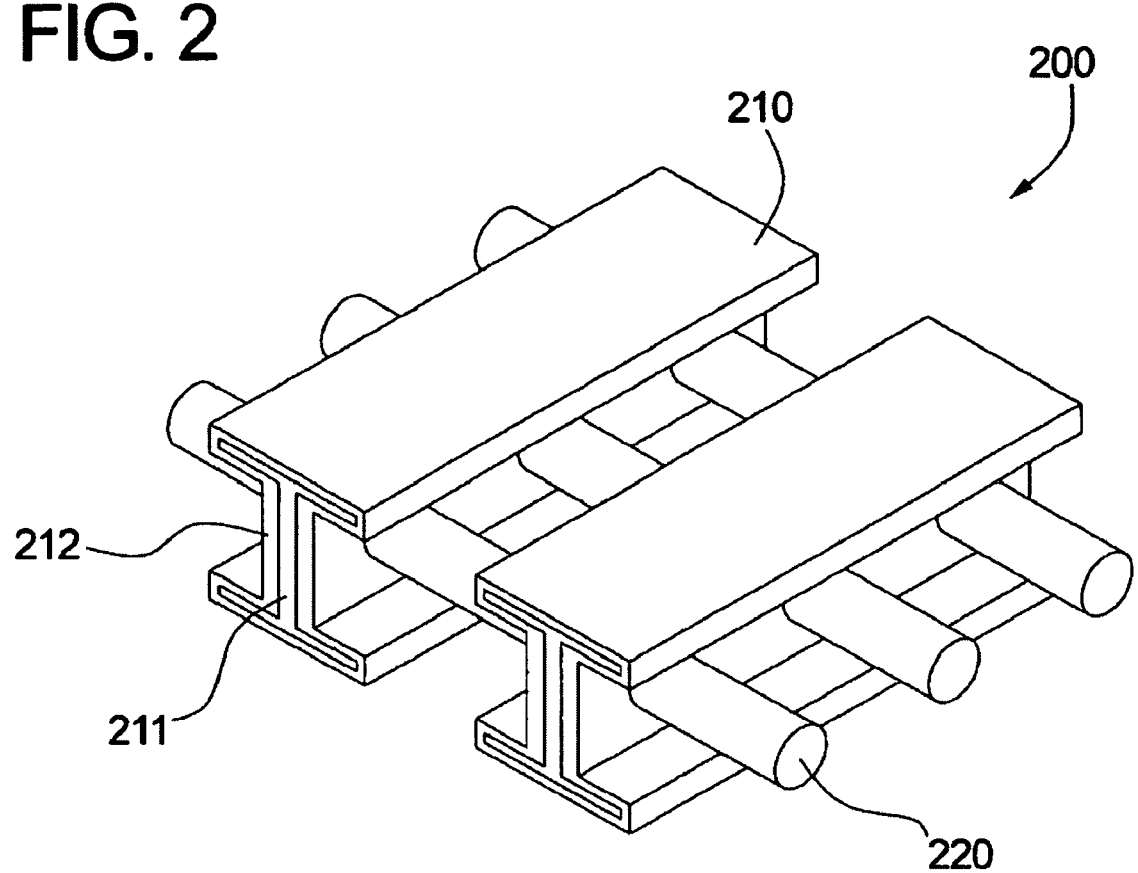
FIG. 2 is a schematic representation of a grating structure, in accordance with an embodiment of the invention.

In a particular embodiment, the structural part made from the fire-resistant composite forms a grating structure 200 such as the one shown in FIG. 2, that is useful as, for example, a floor panel or a stair. The grating structure 200 comprises a series of parallel I-beam support members 210. These I-beam support members 210 are the primary load-bearing elements of the grating structure, and are held together in a parallel relationship by a series transverse tie bars 220. The main function of the transverse tie bars 220 is to fix the parallel relationship between the I-beam support members 210. The transverse tie bars 220 may add to the load bearing characteristics of the grating structure 200, but do not normally bear the major portion of the load. As such, the tie bars 220 may be attached to the I-beam support members 210 by any means that is sufficient to fix the I-beam support members 210 in a parallel relationship at a predetermined spacing. The fire-resistant structural composite of the present invention may comprise all or a portion of the elements of the grating structure 200. For instance, each I-beam support member 210 comprises an internal component 211, and an external component 212. The internal component 211 of the I-beam support members 210 may be comprised (entirely or in part) of the fire-resistant structural composite material of the present invention, such as a pultruded glass-reinforced phenolic resin composite with ATH. Alternately, the internal component 211 of the I-beam support member 210 may be comprised of another material, suitable for this primary load-bearing element, such as a metal or composite material. The external component 212 of the I-beam support members 210 may also be comprised, entirely or in part, of the fire-resistant structural composite material of the present invention, or may be comprised of another material, such as, for example, a braided carbon fiber prepreg composite material that wraps the internal component 211. Likewise, the transverse tie bars 220 may be comprised entirely or in part of a fire-resistant structural composite of the present invention. When the fire-resistant composite of the present invention comprises all or a portion of the grating structure 200, the grating structure is capable of exhibiting superior strength and fire-resistant properties. In an alternate embodiment, a floor panel or a stair may be formed from the structural composite of the present invention, being formed into a conventional panel configuration, such as a textured (e.g., diamond plate) panel, or formed in the manner of an expanded metal sheet. In yet another embodiment, the fire-resistant composite of the present invention may by sprayed on to a structural panel, to impart structural and fire-resistant properties to the panel.

Figure 3:
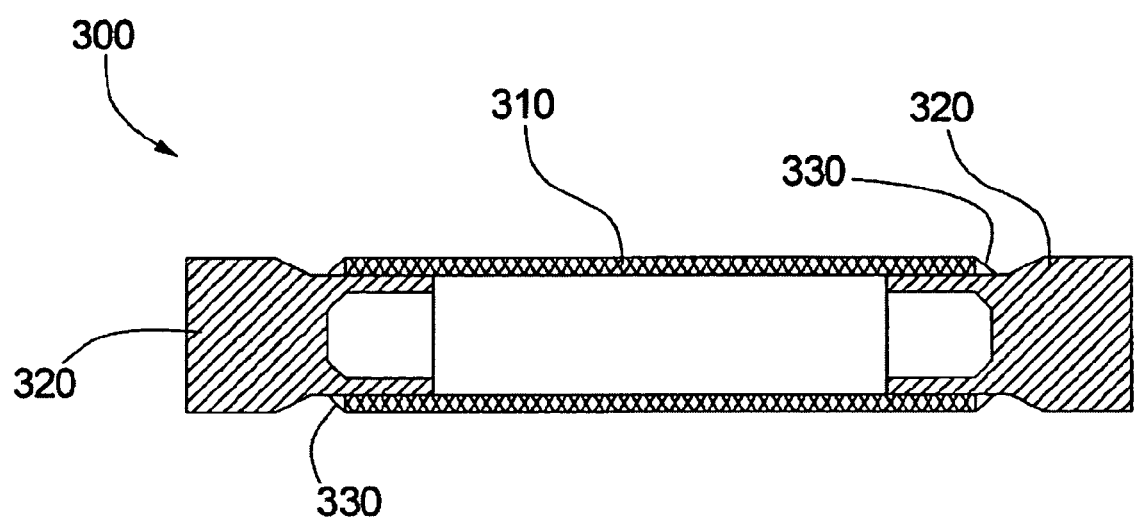
FIG. 3 is a schematic representation of a motor shaft, in accordance with an embodiment of the invention.

A structural part of the present invention may also be useful in all or a portion of a motor component, such as, for example, a motor housing or a motor shaft. By way of example, FIG. 3 shows a motor shaft 300 that may be made from the fire-resistant structural composite material of the present invention. As shown, the motor shaft 300 comprises a tubular body 310 connected to two metal connector fittings 320 at joints 330. The motor shaft 300 may be suitable for use in applications demanding torsional, compressive, or tensile strength. In this particular embodiment, the tubular body 310 comprises the fire-resistant structural composite of the present invention. Alternately, the tubular body 310 may also include metallic or other materials. A motor shaft 300 comprised of a composite material provides reduced weight and rotational inertia, increased damping properties and improved corrosion resistance as compared to metal shafts. By using the fire-resistant structural composite material of the present invention, the motor shaft 300 also exhibits superior fire-resistant characteristics. Other examples of motor components having composite portions, and methods of forming them are described in U.S. Pat. No. 6,069,421, to Smith et al.; U.S. Pat. No. 6,072,252 to Van Dine, et al.; U.S. Pat. No. 6,125,528 to Van Dine et al.; U.S. Pat. No. 6,150,743, to Van Dine et al.; U.S. Pat. No. 6,150,747 to Smith, et al.; all of which are incorporated herein by reference.

A structural part may also be useful in all or a portion of a fire enclosure or an enclosure component, such as, for example, a wall panel, a ceiling panel or a floor panel. A structural part may also be useful in an external body panel, particularly a load-bearing body panel, such as a stressed skin structure, or a monocoque panel.

A structural part made in accordance with the present invention is useful in many different industrial applications, particularly where fire performance requirements are imposed. For instance, it may be useful in a marine structure, to form either an external or internal component. A structural panel may also be useful in an aircraft structure, particularly for engine applications and enclosures. A structural panel may also be useful in ground vehicle systems, providing increased survivability and safety. A structural panel may also be useful in construction applications, such as composite cladding of structural girders.

In addition to exhibiting excellent fire-resistant and mechanical properties, the fire-resistant structural composites of the present invention are economical. These composites cost less than $10 per pound (as compared to the specialty chemicals described above, which cost between $100-$1000 per pound). Because the composite itself is fire-resistance, the need for extra fire insulation is eliminated, which reduces cost and maintenance, and improves space-efficiency of the structural composite. The fire-resistant composites are more economical than metallic structures because they are lighter than metallic structures and have superior corrosion resistance. In summary, the total ownership costs for these fire-resistance structural composites are significantly improved over other materials, because of the reduced installed costs, improved efficiency, and reduced maintenance costs.

While the present invention has been described and illustrated herein with reference to various preferred embodiments it should be understood that these embodiments are exemplary only, and the present invention is limited only by the following claims. Furthermore, to the extent that the features of the claims are subject to manufacturing variances or variances caused by other practical considerations, it will be understood that the present claims are intended to cover such variances.

What is claimed is:

1. A fire-resistant structural composite material comprising:
   a phenolic resin system,
   reinforcing fibers, and
   alumina tri-hydrate;
   whereby the composite material has an ASTM E-1354 Ignitability of greater than about 60 seconds, an ASTM E-1354 300-Second Average Heat Release of less than about 120 kW/m$^2$, and an ASTM E-1354 Peak Heat Release of less than about 150 kW/m$^2$ when the composite is exposed to a radiant heat source of about 100 kW/m$^2$; and
   wherein the composite material is suitable for forming into a structural part.

2. The composite material of claim 1, wherein the phenolic resin system is acid-catalyzed.

3. The composite material of claim 1, wherein the phenolic resin system is base-catalyzed.

4. The composite material of claim 1, wherein the phenolic resin system comprises about 17% to about 21% by weight of the composite material, based on the total weight of the composite material.

5. The composite material of claim 1, wherein the reinforcing fibers are selected from group consisting of glass fiber, carbon fibers, and mixtures and combinations thereof.

6. The composite material of claim 1, whereby the composite material comprises about 63% to about 77% by weight reinforcing fibers, based on the total weight of the composite.

7. The composite material of claim 1, whereby the composite material comprises about 7% to about 12% by weight alumina tri-hydrate, based on the total weight of the composite material.

8. The composite material of claim 2, whereby the composite material comprises about 7%-9% by weight alumina tri-hydrate, based on the total weight of the composite material.

9. The composite material of claim 3, whereby the composite material comprises about 12% by weight alumina tri-hydrate, based on the total weight of the composite material.

10. The composite material of claim 1, wherein the phenolic resin system additionally comprises a siloxane modifier.

11. The composite material of claim 1, whereby the composite material is formed by a method selected from the group consisting of: resin transfer molding resin infusion, filament winding, pultrusion and vacuum assisted resin transfer molding.

12. The composite material of claim 1, wherein the composite material is suitable for forming into a structural part without requiring additional structural materials.

13. The composite material of claim 1, wherein the composite material has an ISO 9705 Average Heat Release Rate of less than about 100 kW, and an ISO 9705 Smoke Production Rate of less than about 1.4 m2/second.

14. The composite material of claim 1, wherein the composite material has an ASTM E-1354 Ignitability of greater than about 90 seconds, an ASTM E-1354 300-Second Average Heat Release of less than about 100 kW/m2, and an ASTM E-1354 Peak Heat Release of less than about 100 kW/m2 when the composite is exposed to a radiant heat source of about 75 kW/m2.

15. The composite material of claim 1, wherein the composite material has an ASTM E-1354 Ignitability of greater than about 150 seconds, an ASTM E-1354 300-Second Average Heat Release of less than about 50 kW/m2, and an ASTM E-1354 Peak Heat Release of less than about 65 kW/m2 when the composite is exposed to a radiant heat source of about 50 kW/m2.

16. A structural part formed from a fire-resistant composite material comprising:
a phenolic resin system,
reinforcing fibers, and
alumina tri-hydrate;
whereby the composite material has an ASTM E-1354 Ignitability of greater than about 60 seconds, an ASTM E-1354 300-Second Average Heat Release of less than about 120 kW/m$^2$, and an ASTM E-1354 Peak Heat Release of less than about 150 kW/m$^2$ when the composite is exposed to a radiant heat source of about 100 kW/m$^2$.

17. The structural part of claim 16, wherein the phenolic resin system is acid-catalyzed.

18. The structural part of claim 16, wherein the phenolic resin system is base-catalyzed.

19. The structural part of claim 16, wherein the phenolic resin system comprises about 17% to about 21% by weight of the composite material, based on the total weight of the composite material.

20. The structural part of claim 16, wherein the reinforcing fibers are selected from group consisting of glass fiber, carbon fibers, and mixtures and combinations thereof.

21. The structural part of claim 16, whereby the composite material comprises about 63% to about 77% by weight reinforcing fibers, based on the total weight of the composite.

22. The structural part of claim 16, whereby the composite material comprises about 7% to about 12% by weight alumina tri-hydrate, based on the total weight of the composite material.

23. The structural part of claim 17, whereby the composite material comprises about 7%-9% by weight alumina tri-hydrate, based on the total weight of the composite material.

24. The structural part of claim 18, whereby the composite material comprises about 12% by weight alumina tri-hydrate, based on the total weight of the composite material.

25. The structural part of claim 16, wherein the phenolic resin system additionally comprises a siloxane modifier.

26. The structural part of claim 16, whereby the composite material is formed by a method selected from the group consisting of: resin transfer molding resin infusion, filament winding, pultrusion and vacuum assisted resin transfer molding.

27. The structural part of claim 16, wherein the composite material is suitable for forming into a structural part without requiring additional structural materials.

28. The structural part of claim 27, wherein the composite material forms the entire load bearing path of the structural part.

29. The structural part of claim 16, wherein the composite material has an ISO 9705 Average Heat Release Rate of less than about 100 kW, and an ISO 9705 Smoke Production Rate of less than about 1.4 m2/second.

30. The structural part of claim 16, wherein the composite material has an ASTM E-1354 Ignitability of greater than about 90 seconds, an ASTM E-1354 300-Second Average Heat Release of less than about 100 kW/m2, and an ASTM E-1354 Peak Heat Release of less than about 100 kW/m2 when the composite is exposed to a radiant heat source of about 75 kW/m2.

31. The structural part of claim 16, wherein the composite material has an ASTM E-1354 Ignitability of greater than about 150 seconds, an ASTM E-1354 300-Second Average Heat Release of less than about 50 kW/m2, and an ASTM E-1354 Peak Heat Release of less than about 65 kW/m2 when the composite is exposed to a radiant heat source of about 50 kW/m2.

* * * * *